United States Patent
Nagvenkar et al.

(10) Patent No.: US 11,593,557 B2
(45) Date of Patent: Feb. 28, 2023

(54) DOMAIN-SPECIFIC GRAMMAR CORRECTION SYSTEM, SERVER AND METHOD FOR ACADEMIC TEXT

(71) Applicant: Crimson AI LLP, Mumbai (IN)

(72) Inventors: Apurva Nagvenkar, Mumbai (IN); Sachin Rane, Mumbai (IN); Sharad Mittal, Mumbai (IN); Trinka D'Cunha, Mumbai (IN)

(73) Assignee: Crimson AI LLP, Mumbai (IN)

( * ) Notice: Subject to any disclaimer, the term of this patent is extended or adjusted under 35 U.S.C. 154(b) by 302 days.

(21) Appl. No.: 16/908,082

(22) Filed: Jun. 22, 2020

(65) Prior Publication Data

US 2021/0397787 A1    Dec. 23, 2021

(51) Int. Cl.
G06F 40/253    (2020.01)
G06F 40/289    (2020.01)
G06N 3/04    (2023.01)

(52) U.S. Cl.
CPC .......... *G06F 40/253* (2020.01); *G06F 40/289* (2020.01); *G06N 3/04* (2013.01)

(58) Field of Classification Search
None
See application file for complete search history.

(56) References Cited

U.S. PATENT DOCUMENTS

| | | |
|---|---|---|
| 5,477,448 A | 12/1995 | Golding et al. |
| 9,575,955 B2 | 2/2017 | Kim et al. |
| 2014/0163963 A2 | 6/2014 | Dahlmeier et al. |
| 2017/0185583 A1* | 6/2017 | Pino .................... G06F 40/47 |
| 2019/0205372 A1 | 7/2019 | Li et al. |
| 2019/0236132 A1* | 8/2019 | Zhu ...................... G06N 20/20 |
| 2019/0266246 A1* | 8/2019 | Wang .................... G06N 3/04 |

(Continued)

FOREIGN PATENT DOCUMENTS

| KR | 10-2016-0034678 A | 3/2016 |
|---|---|---|
| KR | 10-1621154 B1 | 5/2016 |

(Continued)

OTHER PUBLICATIONS

Zhou, Wangchunshu, Tao Ge, Chang Mu, Ke Xu, Furu Wei, and Ming Zhou. "Improving grammatical error correction with machine translation pairs." arXiv preprint arXiv:1911.02825 (2019). (Year: 2019).*

(Continued)

*Primary Examiner* — Frank D Mills
(74) *Attorney, Agent, or Firm* — Sughrue Mion, PLLC

(57) ABSTRACT

A method of identifying text (e.g., a sentence or sentence portion) in a word processing text editor; automatically identifying a domain-specific deep-learning neural network that corresponds to an identified context, from among one or more domain-specific deep-learning neural networks; automatically identifying at least one suggested replacement word using the identified domain specific deep-learning neural network that corresponds to the identified context; and automatically controlling a display to display a user interface that includes functionality that presents prompt information that includes the at least one suggested replacement word. Changes for errors that are common in academic papers written by non-native speakers may be suggested.

16 Claims, 11 Drawing Sheets

(56) References Cited

U.S. PATENT DOCUMENTS

2019/0370393 A1 12/2019 Finch et al.
2021/0374340 A1* 12/2021 Li .................. G06F 40/166

FOREIGN PATENT DOCUMENTS

WO 2013/191662 A1 12/2013
WO 2019/024050 A1 2/2019

OTHER PUBLICATIONS

Korotkova, Elizaveta, Agnes Luhtaru, Maksym Del, Krista Liin, Daiga Deksne, and Mark Fishel. "Grammatical error correction and style transfer via zero-shot monolingual translation." arXiv preprint arXiv:1903.11283 (2019). (Year: 2019).*
International Search Report dated Sep. 22, 2021 in International Application No. PCT/IB2021/055510.
Written Opinion of the International Searching Authority dated Sep. 22, 2021 in International Application No. PCT/IB2021/055510.
"Rewrite in Word—Say it another way!", Office Insider Blog, Aug. 12, 2019, XP055710903, https://blog-insider.office.com/2019/08/12/rewrite-in-word-say-it-another-way/ (4 pages total).
Lambert, "Microsoft Word 2019: Step by Step", Feb. 4, 2019, Microsoft Press, XP055823232, pp. 399-411 (24 pages total).
Ge et al., "Reaching Human-Level Performance in Automatic Grammatical Error Correction: An Empirical Study", Microsoft Research Technical Report, Jul. 3, 2018, pp. 1-15 (15 pages total).
Dahlmeier et al., "A Beam-Search Decoder for Grammatical Error Correction", Proceedings of the 2012 Joint Conference on Empirical Methods in Natural Language Processing and Computational Natural Language Learning, pp. 568-578, Jul. 2012 (11 pages total).
Ailani et al., "Grammatical Error Correction (GEC): Research Approaches till now", International Journal of Computer Applications (0975-8887), 2019, vol. 178, No. 40, pp. 1-3 (3 pages total).
Raymond Hendy Susanto et al., "System Combination for Grammatical Error Correction", Proceedings of the 2014 Conference on Empirical Methods in Natural Language Processing (EMNLP), Oct. 25-29, 2014, pp. 951-962.
Roman Grudkiewicz et al., "Near Human-Level Performance in Grammatical Error Correction with Hybrid Machine Translation", Proceedings of NAACL-HLT2018, Jun. 1-6, 2018, pp. 284-290.

* cited by examiner

Document Registry

| DOCUMENT_ID | DOCUMENT_PATH | DOMAIN |
|---|---|---|
| D101 | C:\TrainingDocs\Chemistry\Oct2015ChemistryJournalPublication.doc | Chemistry |
| D102 | C:\TrainingDocs\PoliticalScience\May2020CNN_Warren_VP_Contender.pdf | Political Science |
| D103 | C:\TrainingDocs\Chemistry\November2015ChemistryJournalPublication.doc | Chemistry |
| D104 | C:\TrainingDocs\SocialScience\May2020SocialSciJournal_Postcolonial_thought.pdf | Social Science |
| D105 | C:\TrainingDocs\SocialScience\May2015SocialSciProfessorBlogEntry.pdf | Social Science |
| D106 | C:\TrainingDocs\Chemistry\December2015ChemistryJournalPublication.doc | Chemistry |

FIG. 6A

Sentence Registry

| SENTENCE_ID | SENTENCE | SENTENCE_META (KEY/VALUE PAIRS) | DOCUMENT_ID |
|---|---|---|---|
| S101 | Why do we need another book on postcolonial theories when there are already so many? | OBJECTARRAY1 | D104 |
| S102 | Julian Go's book Postcolonial thought and social theory asks a simple but forgotten question: can postcolonial thought and social theory reconcile? | OBJECTARRAY2 | D104 |
| S103 | Some readers, if not familiar with the origin of postcolonial thought, might be confused by this question: are there even conflicts between these two? | OBJECTARRAY3 | D104 |
| S104 | boy go to school | OBJECTARRAY4 | D106 |

FIG. 6B

OBJECTARRAY4

```
"input": "boy go to school",
  "tokens": ["boy", "go", "to", "school"],
  "proposer": {
    "rules": [
      {"index": (0, 2), "suggestion": "a boy"},
      {"index": (0, 2), "suggestion": "an boy"},
      {"index": (0, 2), "suggestion": "the boy"}
    ],
    "dl_model1": [
      {"index": (4, 5), "suggestion": "goes"}
    ],
    "smt": [
      {"index": (4, 5), "suggestion": "a school"}
    ]
  }, "decoder": [
    [
      {"index": (0, 2), "suggestion": "a boy"},
      {"index": (4, 5), "suggestion": "goes"}
    ]
  ], "post_processing": [
    [
      {"index": (0, 2), "suggestion": "A boy"},
      {"index": (4, 5), "suggestion": "goes"}
    ]
  ],
  "output": [
    {"index": (0, 2), "suggestion": "A boy", "level": 1},
    {"index": (4, 5), "suggestion": "goes", "level": 1}
  ]
}
```

FIG. 6C

DOMAIN-SPECIFIC GRAMMAR CORRECTION SYSTEM, SERVER AND METHOD FOR ACADEMIC TEXT

1. FIELD

This disclosure is related to word processing (text editor) application technology. In particular, the disclosure is related to a grammar checker (grammar correction technology) in word processing (text editor) user application technology.

2. DESCRIPTION OF RELATED ART AND RELATED ART PROBLEMS

There are some grammar checkers available in the related art, such as Grammarly and Microsoft spell checker. However, the related art has many problems. As an example, the related art is not suitable for many researchers who are drafting papers in a non-native language (such as English when the researcher/drafter is not a native of an English-speaking country) (where an English-speaking country means the official language or the language used by the majority in that country is English).

These research papers (documents) may each have their own vocabulary. That is, different scientific or academic research areas may have different grammar or terms used.

The non-native language speakers may have difficulties drafting papers for publication written in the non-native language (e.g., English) in reputed scientific or academic international journals because of unfamiliarity with the language (e.g., unfamiliarity with the subject-specific language in the non-native language).

To solve this problem, researchers drafting papers in a non-native language normally may hire a human editor (e.g., a specialized academic English editor for polishing their papers, or a specialized academic English Chemistry-specific editor). However, hiring a human editor for manual checking of the document is time-consuming and increases costs.

Thus, an automated tool that could perform same or similar functions of the human editor (e.g., a specialized academic English-language, Chemistry-specific editor) using a trained neural network is needed in the art of automated tools. The automated tools in the related art for "polishing" of English text, for example, Grammarly, Language Tools, etc., do not address this problem.

That is, although some automated grammar correction tools exist in the related art, they are focused on correcting general everyday use English. The language used in academic journals, on the other hand, is specialized and uses some different conventions specific to the academic context that are different from general English. For example, the conventions specific to the academic context may include a highly specialized vocabulary that may change from subject to subject (i.e., from academic context to academic context, e.g., from Chemistry to Political Science). For example, the terms used in a chemistry journal may be vastly different from the terms used in a political science journal. Thus, language that is specific to a context may be referred to as domain-specific language. That is, in such a domain-specific context (e.g., a Chemistry context), a need exists for a more accurate automated grammar correction tool.

The related art is not trained on datasets of such domain-specific language. As a result, the related art cannot correct many of the errors present in academic papers written by non-native speakers or they incorrectly change domain-specific language (false positives) that is uncommon in normal non-academic English.

Another problem with the related art is how to combine output of different correction systems to give a coherent final output. Errors in a sentence can be corrected using different approaches, e.g., a rule-based approach (RB), statistical machine translation (SMT), neural machine translation (NMT), etc. For example, one error in a sentence may be corrected by the RB system and some other error may be corrected by the NMT system.

SUMMARY

According to an embodiment of the disclosure, a responsive server for performing a domain-specific grammar correction process may be provided. The responsive server, according to an embodiment, may comprise: a network communication interface configured to communicate with one or more user terminals over a network; and a processor configured to: control the network communication interface to provide (e.g., within a displayed word processing text editor application of a user terminal, such as a standalone application, or a website, a domain-specific grammar correction feature.

The domain-specific grammar correction process may include: identifying text input by a user; automatically identifying a domain-specific deep-learning neural network that corresponds to an identified context, from among one or more trained domain-specific deep-learning neural networks; automatically identifying one or more words in the identified text that have one or more potential replacement words for replacing the one or more words in the identified text using the identified domain specific deep-learning neural network that corresponds to the identified context; obtaining a first score of the one or more words in the identified text; and obtaining a second score of the one or more potential replacement words; and based on determining that the first score is better than the second score, automatically controlling a display to display a user interface that includes functionality that presents prompt information that includes the one or more potential replacement words.

According to an embodiment, the domain-specific grammar correction process may include: identifying a subject area of text input by a user; automatically identifying a domain-specific deep-learning neural network that corresponds to the identified subject area, from among one or more trained domain-specific deep-learning neural networks; automatically identifying one or more words in the identified text that have one or more potential replacement words for replacing the one or more words in the identified text using the identified domain specific deep-learning neural network that corresponds to the identified context; obtaining a first score of the one or more words in the identified text, and obtaining a second score of the one or more potential replacement words; and based on determining that the first score is better than the second score, automatically controlling a display to display a user interface that includes functionality that presents prompt information that includes the one or more potential replacement words.

According to an embodiment, the prompt information may be displayed when the second score is better than or equal to the first score (instead of only better than). According to an embodiment, the one or more potential replacement words may include two words, such as, a modifier with another word (e.g., "a closing" could replace "close"). The identified text may include more than one word that has a suggested replacement(s). See, e.g., FIGS. 7A-7D. The identified text may correspond to one of: a word, a group of words, a full sentence, a partial sentence, or multiple sentences. According to an embodiment, the identified text may be from a full document that includes text, such as a word processing document, or text input into a web page that includes text. The identified text may include text that may need to be changed, but some user text may have some portion of the text (e.g., words/sentences) that do not need any change(s). That is, not all sentences have suggested changes.

The processor may be further configured to, after presenting the prompt information: receive user input regarding the at least one suggested replacement word, based on the received user input indicating that the at least one suggested replacement word is accepted, correct at least a portion of the identified text using the accepted at least one suggested replacement word; and based on the received user input indicating that the at least one suggested replacement word is rejected, control the display to stop the display of the prompt information without making any change to the respective portion of the identified text. In an embodiment, based on the received user input indicating that the at least one suggested replacement word is rejected, the processor may be further configured to remove the at least one suggested replacement word from a list of suggestions associated with the portion of the identified text. In an embodiment, the rejection of the suggested replacement word may be used to automatically generate postprocessing rules to reject the change for similar portions of text (e.g., sentences) in the future.

According to an embodiment, the processor may be further configured to: collect documents from one or more sources; obtain training data for each of different subject matter-specific fields of the documents; and perform control so that natural language processing (NLP) is used to build a domain-specific deep-learning neural network model for one or more of the different subject matter-specific fields. According to an embodiment, a domain-specific (or subject matter-specific) deep-learning neural network may be built by using the obtained training data associated with a respective one of the subject-matter specific fields as input, when a number of documents in the obtained training data associated with the respective one of the subject-matter specific fields is greater than or equal to a threshold value.

According to an embodiment, the processor may be further configured to: automatically identify a trained subject-specific neural network that corresponds to a current subject, which is a subject that is either set in advance or that is automatically identified based on a context of the input text. The context of the input text may be determined in advance, or on the fly (in real time). For example, the context may be determined in advance based on a context associated with a user or a context of a current document. The input text may be a full sentence, or a partial sentence (a sentence portion).

According to an embodiment, the domain-specific deep-learning neural network may include different error correction methods including a rule-based (RB) module, a statistical machine translation (SMT) module, a neural machine translation (NMT), and a subject-specific deep learning module, and each of the different error correction methods may suggest independent corrections to the sentence.

According to an embodiment, the processor may be further configured to: combine outputs from the different error correction methods to provide a final fluent recommended sentence (or final fluent sentence portion) for the specific domain.

According to an embodiment, the processor may be further configured to: combine outputs from the different error correction methods by: using a Beam search technique, which is a heuristic-based search algorithm that explores a graph by generating a correct sentence by expanding a most promising node. According to an embodiment, a decision of choosing a node may be based on a score that represents the fluency of a sentence or sentence portion.

According to an embodiment, the score that represents the fluency of a sentence (or sentence portion) may be a perplexity score, which is a measurement of how well a probability model predicts a sample of a sentence (or sentence portion) in a chosen language model.

According to an embodiment, the processor may be further configured to: based on the score that represents the fluency of the sentence, identify a final fluent sentence by accepting correct suggestions and rejecting incorrect suggestions given by the different error correction methods.

The processor may be further configured to: output to the user terminal at least one of the correct suggestions as a proposed suggested change for the identified input text or a sentence portion of the identified text.

The processor may be further configured to: accept correct suggestions and reject incorrect suggestions given by the different error correction methods by: representing all the suggestions for a word (or prepositional phrase) along with the original word (or original prepositional phrase) in a hypothesis space; starting generating the sentence from scratch starting from a leftmost word for which a suggestion has been made; computing a first score for the leftmost word (or leftmost prepositional phrase) for which at least one suggestion has been made, and a second score for the at least one suggestion itself. According to an embodiment, the second score may include more than one score. According to an embodiment, the processor may be further configured to backtrack and identify all suggestions for the identified text (e.g., a sentence or sentence portion) having a best score; and select portions of text having the best score as fluent text (e.g., a fluent sentence or fluent sentence portion). According to an embodiment, the second score may include two additional scores, including one score for two suggestions, respectively (i.e., one score for each of the at least one suggestion).

The processor may be further configured to: use a left-to-right beam search technique to calculate a left-to-right score as a current score, and calculate a future score, which is a score computed by considering a right-to-left beam search, wherein the current score is the left-to-right score computed from the 0th to the ith position whereas the future score computes a score from the n−1th to the ith position where n is the length of the sentence, and a final score is a sum of the current score and the future score.

The processor may be further configured to: select a target sentence by combining the output from several different models including one subject-specific DL neural network model from among a plurality of different subject-specific neural network models that have each been trained using subject-specific documents and manuscripts using a search tree produced by a beam-search decoder.

The scoring logic may be purely based on the subject-specific deep learning neural network language model.

The subject-specific deep learning neural network language model may be run on a general processor or a parallel computing processor, such as a graphics processing unit (GPU).

The processor may be further configured to: perform post-processing of the fluent final sentence (or sentence portion) including one or more of: labeling each of the correct suggestions into different error categories, removing incorrect suggestions based on predefined rules, and generating comments to a user to accompany displayable one or more final suggestions for correcting the input sentence (or sentence portion) into the fluent final sentence (or fluent final sentence portion).

According to an embodiment of the disclosure, a method of controlling a responsive server that includes a hardware processor to perform domain-specific grammar correction is provided.

According to an embodiment, the method may comprise: controlling a network communication interface to provide, (e.g., within a displayed word processing text editor of a user terminal), a domain-specific grammar correction feature that includes: identifying, such as, automatically identifying (or detecting) text (e.g., a sentence or sentence portion in the word processing text editor); automatically identifying a domain-specific deep-learning neural network that corresponds to an identified context, from among one or more domain-specific deep-learning neural networks; automatically identifying at least one suggested replacement word using the identified domain specific deep-learning neural network that corresponds to the identified context; and automatically controlling a display to display a user interface that includes functionality that presents prompt information that includes the at least one suggested replacement word. The prompt information may include highlighting of the identified text that is a candidate for replacement with the at least one suggested replacement word. The highlighting may be a background color (e.g., yellow background of the candidate) or bolding, underlining, etc.

The method may further comprise, after presenting the prompt information: receiving user input regarding the at least one suggested replacement word, based on the received user input indicating that the at least one suggested replacement word is accepted, correcting the sentence using the at least one suggested replacement word; and based on the received user input indicating that the at least one suggested replacement word is rejected, removing the at least one suggested replacement word from a list of suggestions associated with the portion of the identified text, and use the updated list to automatically generate postprocessing rules to reject the change for similar portions of text in the future. For example, a user may reject a suggested replacement word by clicking/touching an Ignore or Ignore All button. The Ignore button may reject the suggested replacement word, and the Ignore All button may reject the suggested replacement words for all occurrences of the suggestion in the current text, and make a post-processing rule to reject all occurrences of the same suggestion for the same word in the future. The post-processing rules thus generated will be sent for manual verification to a team of expert and will be added to the pipeline upon their approval According to an embodiment, a non-transitory computer-readable medium comprising computer-executable instructions, which when executed by a processor, cause the processor to perform the method may be provided.

According to an embodiment, a responsive server may comprise: a network communication interface configured to communicate with one or more user terminals over a network; and a processor configured to: collect documents from one or more sources; prepare training data for each of different subject matter-specific fields of the documents; and build a domain-specific deep-learning neural network model by using the obtained training data associated with a respective one of the subject-matter specific fields, when a number of documents in the obtained training data associated with the respective one of the subject-matter specific fields is greater than or equal to a threshold value.

BRIEF DESCRIPTION OF THE DRAWINGS

The disclosed subject matter including features will be more apparent from the following detailed description and the accompanying drawings in which:

FIGS. 6A-6C show data structure(s) that may be used according to an embodiment of the disclosure.

DETAILED DESCRIPTION

As discussed above, there are many different types of correction technology in the related art. However, the related art does not combine all these corrections to make a fluent final sentence (or fluent final sentence portion).

According to an embodiment of the disclosure, outputs from multiple systems may be combined. According to an embodiment of the disclosure, changes for errors that are common in academic papers written by non-native speakers may be suggested. Moreover, the errors detected and changes suggested may be specific to a subject field (e.g., an academic field of the reputable journal papers, etc.). For example, "multicentered bonding" (e.g., in a chemistry paper) would may need correction to "multicenter bonding", but "multicentered society" (e.g., in a social science paper) would not need any correction. In addition, "multicentered bonding" may need to be corrected for chemistry, but not need to be corrected for social science or general academic papers. The inventors perform work related to English Editing, and became aware over the years that the errors in an academic publication or scientific research document may be different from those in a non-academic publication and that the errors present in a document may be (and often are) specific for the subject field of the document. According to an embodiment, natural language processing (NLP) may be used to build language models for a specific subject area. For example, a language model for a specific subject area may be built by training a deep-learning neural network language model provided enough documents (e.g., a number of documents is above a minimum threshold floor) are available for that subject area. Available may mean one or more of: having the document stored, or having access to the document (e.g., online access). By preparing training data for each of the different subject matter-specific fields, models that are specific for the subject field may be built by training. By combining these two facts, the disclosure provides a subject-specific grammar correction engine for academic papers.

Figure 1:
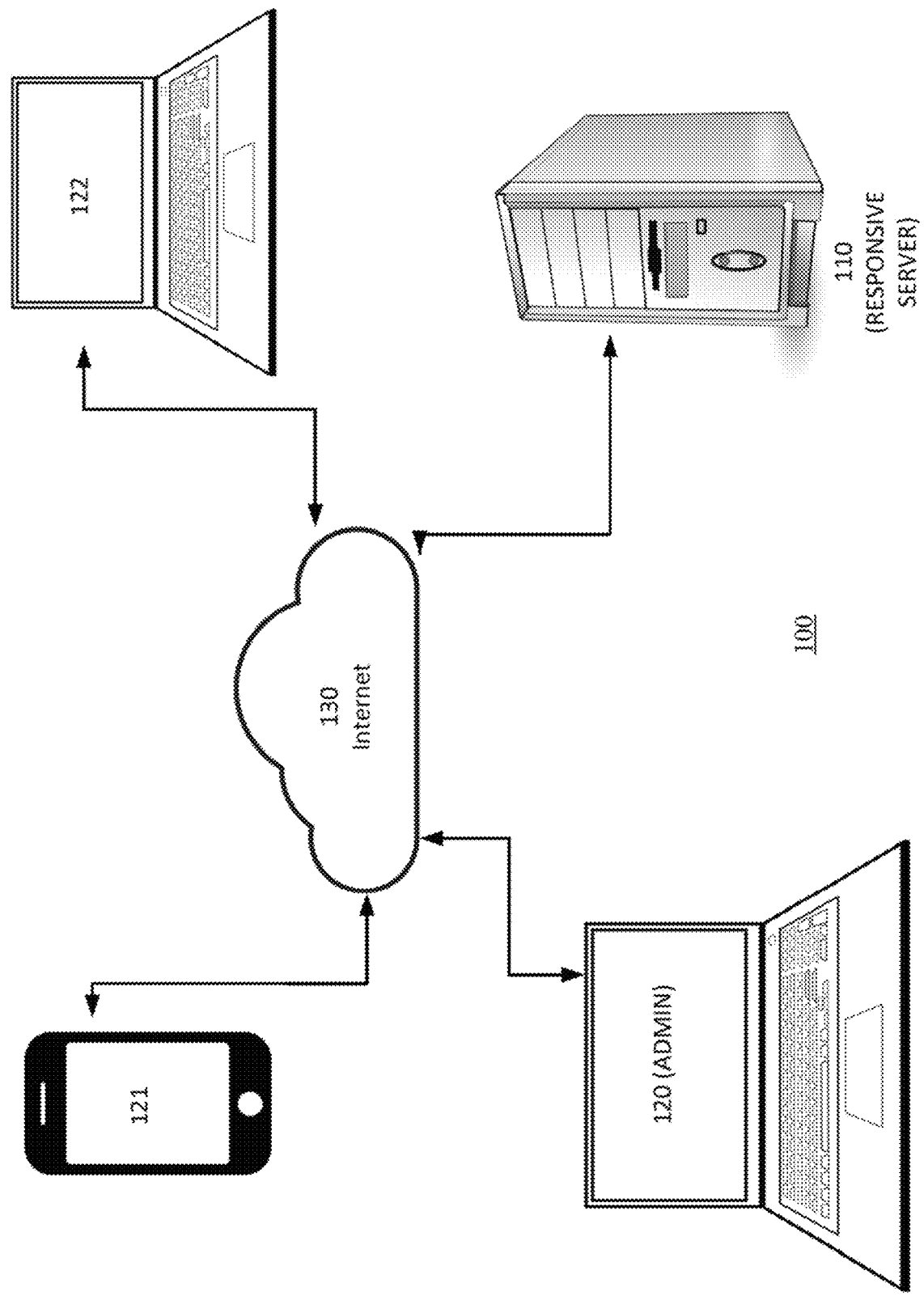
FIG. 1 illustrates a communication system according to an embodiment of the disclosure.

FIG. 1 illustrates a communication system (100) according to an embodiment of the present disclosure. The system (100) may include a server 110 and one or a plurality of user terminals 120. According to an embodiment, the system 100 may include an administrator user terminal 120, and two non-administrator (ordinary) user terminals 121 and 122. The administrator user terminal may set certain tasks such as registration management and customization of the server 110. The administrator terminal 120 may configure the responsive server to perform the subject-specific grammar correction for academic papers. For example, the administrator terminal 120 may set the threshold number of documents needed to build/train a new subject-specific neural network model.

The user terminals 120 and 122 are shown as laptops and the user terminal 121 is shown as a smartphone (mobile device). However, any type of computing device may be used as the user terminals described above, such as, a desktop personal computer (PC), a tablet computer, a laptop, a smartphone, a personal digital assistant (PDA), or an e-book reader, and the like. The user terminals may be communicably connected via a network 130 (e.g., the Internet) so as to communicate with the responsive server 110. The user terminals may include a memory, a communication interface, a display, and a processor.

The network (130) may be any one of a local area network (LAN), a wide area network (WAN) or the Internet. According to an embodiment, the user terminal functionality may also be performed by the responsive server 110. According to an embodiment, the functionality of the server may be performed by the user terminal 121 or user terminal 122. The functionality of the administrator user terminal 120 may also be performed by one of the user terminals 121 or 122.

Figure 2:
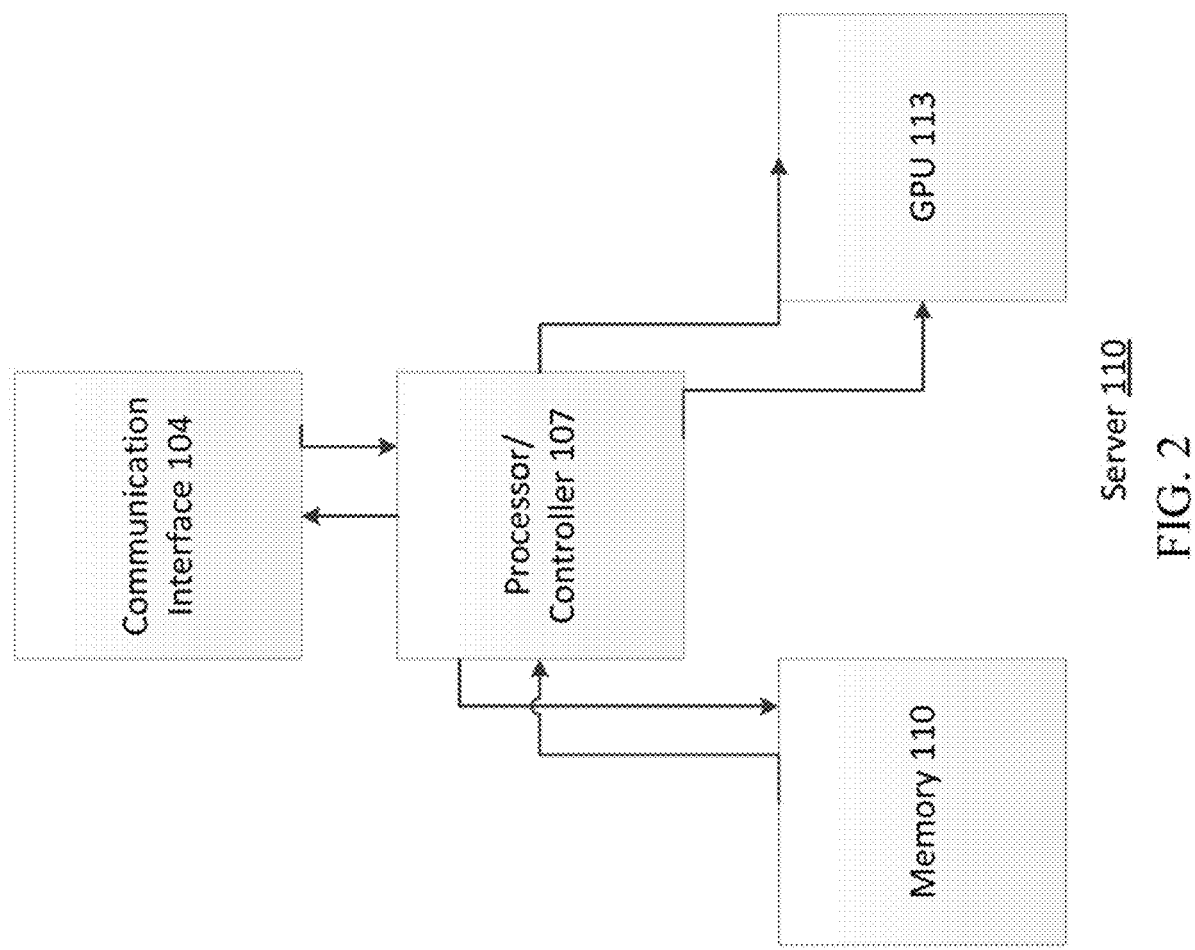
FIG. 2 illustrates a server according to an embodiment.

In an embodiment of the disclosure, as shown in FIG. 2, the server 110 may include a controller (e.g., hardware processor) 107 and one or more memories 110 (data storage). The one or more memories 110 may hereinafter be referred to as a memory 110. The memory 110 may store computer code that includes instructions, which when executed by the processor/controller, causes the controller to execute various functions. The various functions pertinent to this disclosure are explained in detail. However, other functions that are known to one or ordinary skill in the art could also be performed. The controller 107 may be configured to perform the various functions discussed in more detail below.

The controller 107 may include one or more processors and/or may include an Application Specific Integrated Circuit (ASIC).

The memory may include one or more storage devices and associated media, such as, a hard drive, or a solid-state drive. However, other types of media may be used such as CD/DVD ROM/RW, a thumb-drive, a removable hard drive or solid-state drive, a legacy magnetic media such as a tape drive, a floppy disc drive, a specialized ASIC based device, or the like.

"Computer readable media" or "computer readable medium" as used in connection with the specification encompass non-transitory media (e.g., transmission media, or carrier waves). The computer readable media can have computer code for performing various computer-implemented functions. The media storing the computer code can be specially designed and constructed for the purposes of the present disclosure, or can be a common media.

As an example, and not by way of limitation, the controller 107 may provide functionality as a result of processor(s) (including CPUs, GPUs, accelerators, and the like) executing software embodied in one or more tangible, computer-readable media. Such computer-readable media may be media associated with a storage device, or with internal mass storage (e.g., Read-Only Memory (ROM) or Random-Access Memory (RAM)).

The software implementing various embodiments of the present disclosure can be stored in the storage devices and executed by the controller 107.

A computer-readable medium may include one or more memory devices or chips. The software may cause the controller 107 and specifically the processor(s) to execute particular processes or particular parts of particular processes described herein, including defining data structures stored in RAM and modifying such data structures according to the processes defined by the software. In addition, or as an alternative, the controller 107 may provide functionality as a result of logic hardwired or otherwise embodied in a circuit, which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The server 110 may further include a communication interface 104, which may be configured to receive data transmitted from one or more devices, such as, one or more user terminal devices. The communication interface 104 may be a network communication interface.

The communication interface 104 may be configured to transmit, via, for example, control by the controller 107, data to the one or more devices over a network or wirelessly.

The communication interface 104 may also include interface to one or more communication networks (e.g., via the communication interface 104). Networks may be, for example, wired, wireless, or optical. Networks can further be a local area network (LAN), or a wide-area network (WAN) and be real-time. Examples of networks include Ethernet, wireless LANs, cellular networks (e.g., GSM, 3G, 4G, 5G, LTE).

In this regard, the responsive server may be configured to provide real time updates automatically.

The controller 107 may be configured to store, in the memory 110, data received from sources. For example, the controller may be configured to store various documents from various academic journals received as data received from the communication interface 104.

The components shown in FIGS. 1 and 2 are exemplary in nature and are not intended to suggest any limitation as to the scope of the disclosure.

The responsive server 110 may include or be at least configured to be connected to one or more peripheral devices, such as, one or more of: a display (e.g., a touch screen display), a keyboard, a microphone (e.g., for voice input), a camera (e.g., for gesture input), a mouse, a joystick, a scanner, a trackpad, or a biometric capture device (e.g., a device that captures one or more of: fingerprint, palm print, iris information).

The server 110 may include or be at least configured to be connected to one or more output devices, such as, a speaker, or a display or display device (e.g., a mobile phone, computer, or a haptic feedback display touch screen device), a display, tactile output, sound, and light, and smell/taste. The display (sometimes referred to as a display screen) may include any type of display screen, such as, a touch screen display, an OLED screen, an LCD screen, a CRT screen, glasses and printers.

The controller 107 may be connected to each of the other components.

Figure 3:
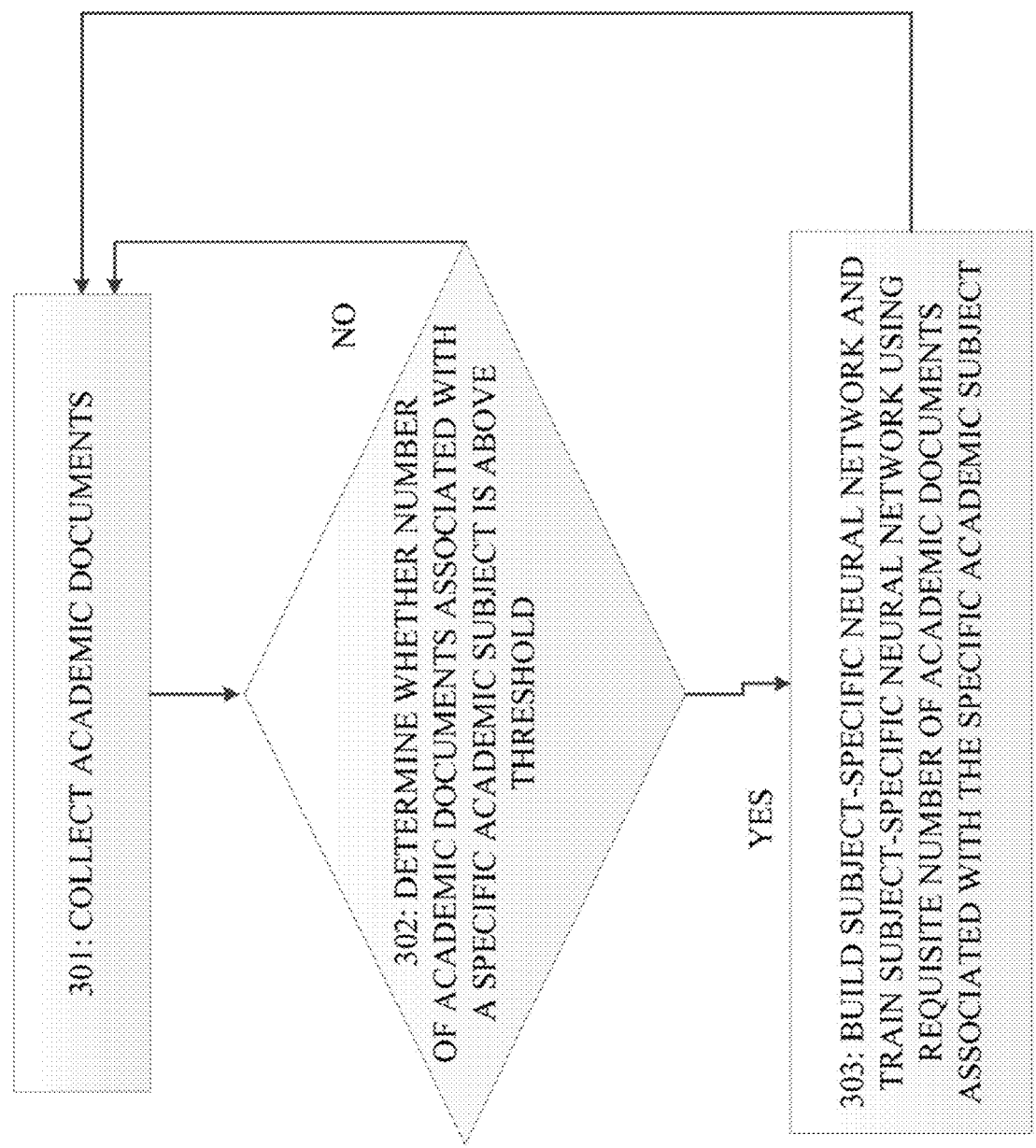
FIG. 3 shows a logic diagram (flowchart) of a processor of a server, in accordance with an embodiment.

FIG. 3 shows a logic diagram (flowchart) of a processor of server 110, in accordance with an embodiment. As discussed above, the processor of the server 110 may be configured to execute code (instructions code) stored in a memory, which causes the processor to execute a series of operations.

The series of operations executed by the processor of the server 110 may include Operations 301-303, as shown in FIG. 3, according to an embodiment. With reference to FIG. 3, according to an embodiment, the server 110 may collect academic documents (Operation 301). The collecting of the academic documents may include receiving a plurality of documents from one or more sources. In addition, the one or more collected documents may be categorized as corresponding to a particular field (or domain), such as a specific academic or scientific research subject. In Operation 302, the server 110 may determine whether a total number of academic documents associated with a specific academic subject is above a threshold. Of course, a different category could be used instead of a specific academic subject. In an embodiment, more than one subject may be used as the specific academic subject.

In Operation 303, the responsive server 110 may perform control to build a subject-specific neural network and train the subject-specific neural network using a requisite number of academic documents associated with the specific academic subject.

Figure 4:
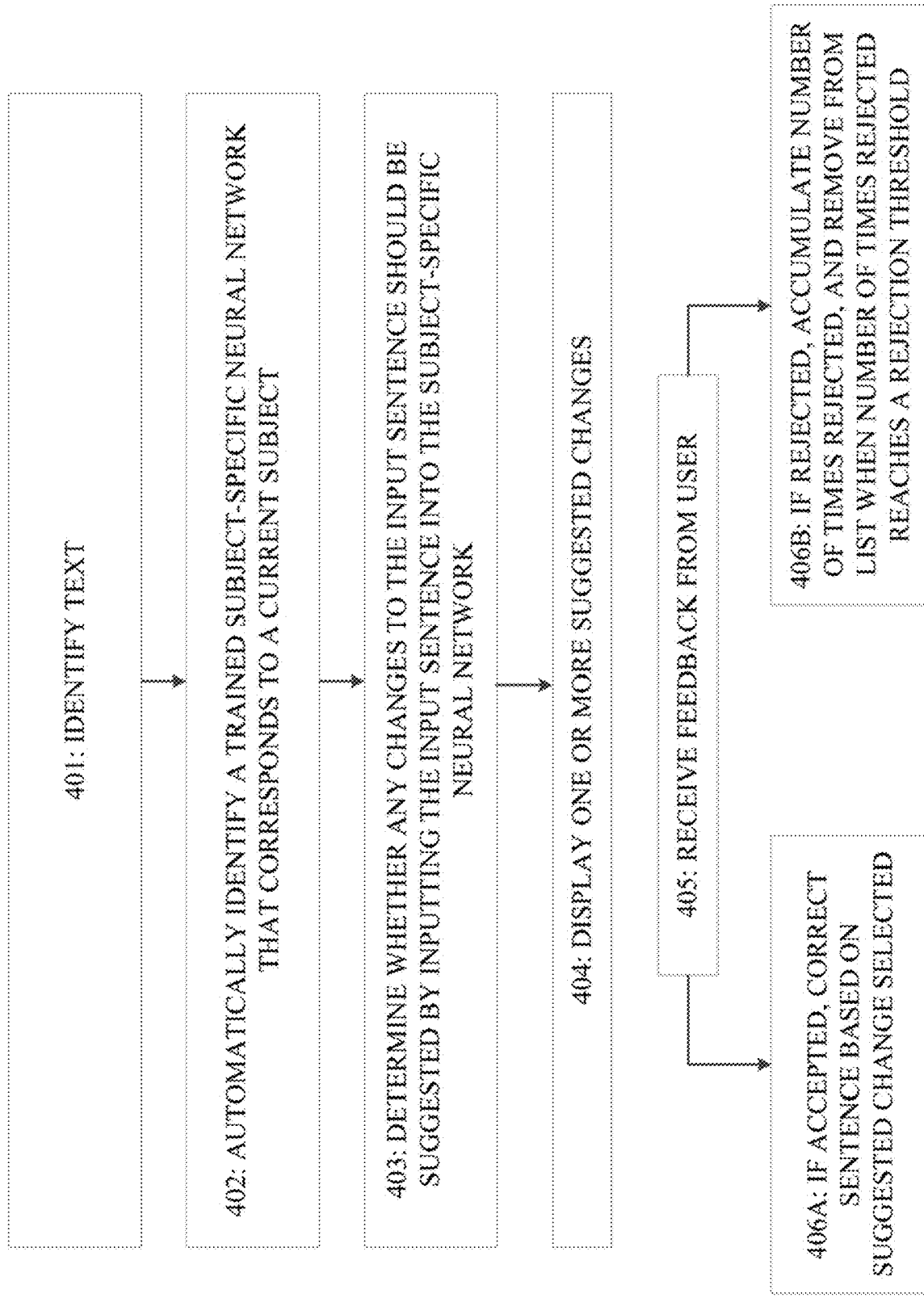
FIG. 4 shows a logic diagram (flowchart) of a processor of a server, in accordance with an embodiment.

The series of operations performed by the server 110 may further include Operations 401-405 in FIG. 4, and one of Operation 406A and Operation 406B. These same operations could be performed by the user terminal. It also is noted that the neural network operations may be performed by a different processor than the processor that is performing the series of operations in FIG. 4. For example, the neural network may be trained using a specific processor (such as a graphics processing unit (GPU) that may have faster processing speed and/or computation speed than a general processor (which may be used to perform the control of FIG. 4)).

In Operation 401, the server 110 may identify or detect (e.g., automatically identify (detect)) text input by a user. The identified text may be a sentence (or sentence portion) input by a user, such as input into a word processing application (e.g., a text editor) or a text input field of a webpage, as examples. The text (e.g., sentence or sentence portion) may be input by a user using a user terminal 121 or 122 when drafting a document (e.g., a letter or paper) within, for example, a word processing application.

In Operation 402, the server 110 may automatically identify a trained subject-specific neural network that corresponds to a current subject. The current subject may be a subject that is set in advance (e.g., set by a user) or may be a subject that is automatically identified (e.g., based on a context of the input text (e.g., sentence or sentence portion), or based on a context of the letter or paper that the user is working on as a whole). The current subject could also be based on a portion of the paper that is larger than a sentence, but smaller than the whole paper. According to an embodiment, a sentence portion may be processed (as discussed in the flowcharts of the disclosure) in real time instead of waiting for an entire sentence to be complete.

In Operation 403, the server 110 may automatically determine whether any changes to the input text should be suggested. An embodiment of this Operation 403 is explained in more detail with reference to FIGS. 5, 6, 7A-C below.

In Operation 404, the server 110 may cause one or more suggested changes to be displayed by the user terminal 121 or 122. For example, the server 110 may transmit displayable information (e.g., graphical user interface control information, or other displayable information).

The displayable information may be in the form of a prompt. The user, in response to the prompt, may provide feedback, which may be transmitted to the server 110 (Operation 405). The feedback may be in the form of accepting one of one or more suggested changes, or rejecting each of the one or more suggested changes.

According to an embodiment, based on the received feedback in Operation 405, the server 110 may perform Operation 406A or 406B. For example, if the received user feedback corresponds to the user selecting and/or accepting a suggested change, the server 110 may update/correct the originally input sentence based on the suggested change being authorized (accepted) by the user (Operation 406A).

According to an embodiment, based on the received feedback corresponding to the user rejecting all of one or more suggested changes (e.g., no selection or acceptance of any selected options), the server may store in a memory an indication of the rejection of the suggested change by the user. Based on this rejection, the server may update a list of suggested changes corresponding to the sentence so as to remove the rejected suggested change from the list.

According to an embodiment of the disclosure, a determination may be made as to whether any suggested changes are to be provided/displayed (e.g., by prompting a text editing user), which, when accepted/selected by a text editing user, correct the identified text (e.g., a sentence or sentence portion) in the document.

Figure 5A:
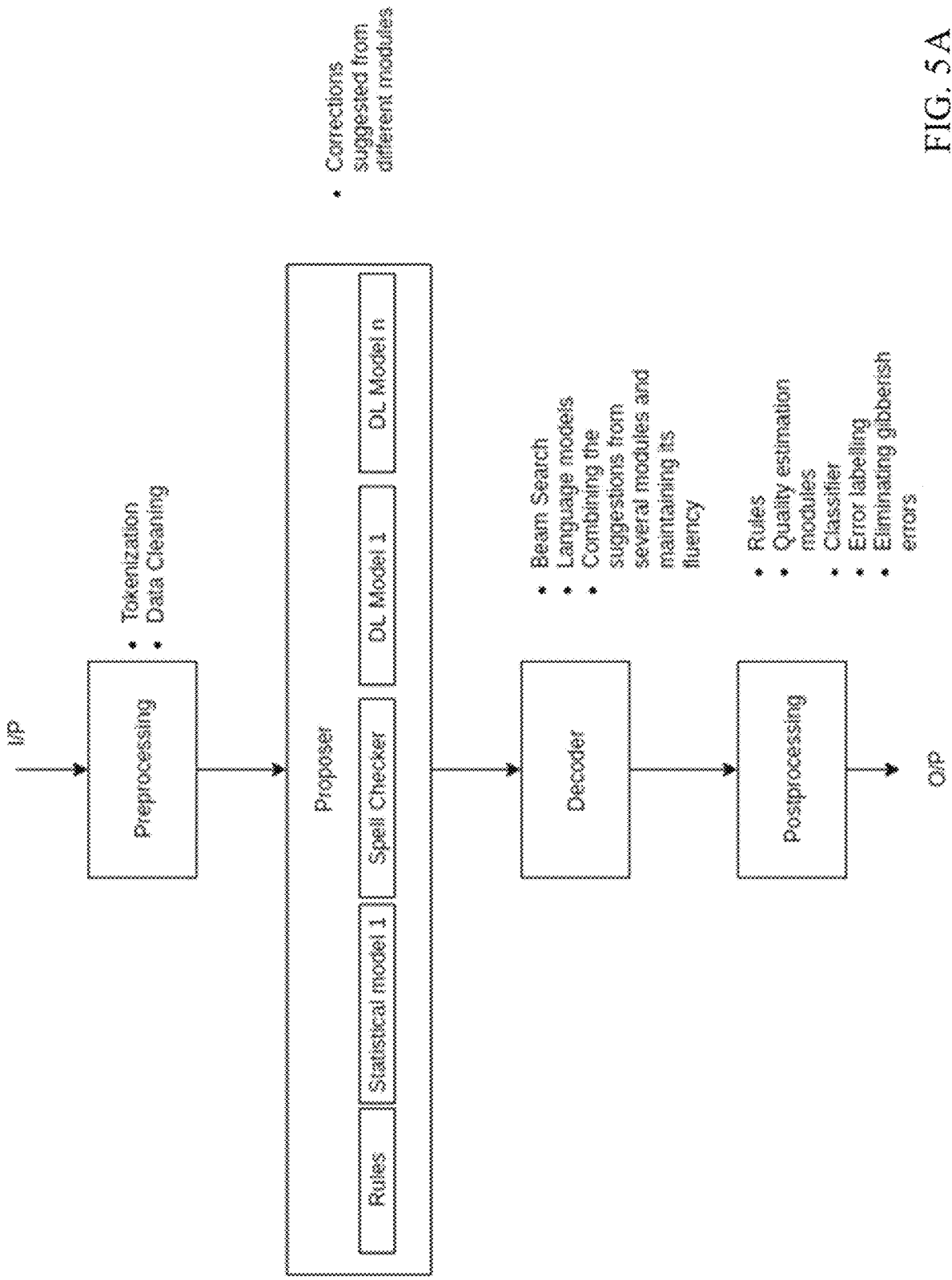
FIG. 5A illustrates an embodiment of Operations related to the determination regarding suggested changes, in accordance with an embodiment.

FIG. 5A illustrates an embodiment of Operations related to the determination regarding suggested changes. That is, FIG. 5A is related to the grammar checking functionality itself. For example, FIG. 5A illustrates an overall flow of operations of the server 110 in relation to determining suggested changes according to an embodiment.

According to an embodiment, as shown in FIG. 5A, text may be input by a user (e.g., entered on a user terminal 121 or 122 via a web-based form or collected through a plugin, such as, a Microsoft (MS)-Word plugin). According to an embodiment, the text input by the user may be segmented into individual sentences. However, the text input may be one sentence or a sentence portion. According to an embodiment, one or more of the individual sentences (or sentence portions) may be processed. The processing may include one or more processors of the server processing the individual sentences or sending the one or more sentences to a different processor (e.g., a GPU) to perform the processing of the individual sentences. Throughout the disclosure, a sentence is used as illustrative, and a sentence portion may be used instead of the full sentence. In an embodiment, the processor 107 and GPU 113 share processing of the individual sentences. In an embodiment, the individual sentence is transmitted to a module that performs a proposer functionality. According to an embodiment, the proposer functionality may include different error correction systems/methods, such as rule-based (RB), statistical machine translation (SMT), neural machine translation (NMT), a deep-learning model 1 (DL1), a deep-learning model 2 (DL2), a deep-learning model n (DLn), etc. The DL1, DL2, . . . DLn may each correspond to a subject-specific neural network. However, the proposer functionality may include more or less systems/methods, and/or a different group of different error correction systems/methods. Each of the individual error correction systems/methods in the proposer functionality may suggest independent corrections to the sentence. According to an embodiment, the independent suggested corrections may be transmitted to a next module (corresponding to a system or method), which may be decoder module. The decoder module may include functionality that evaluates all the suggestions and combines some or all of the suggestions to provide a fluent final sentence. The fluent final sentence may be passed to a postprocessor module. The postprocessor may perform one or more of: labeling each of the suggestions obtained from the decoder module into different error categories, removing incorrect suggestions based on predefined rules, and generating comments to the user to accompany the displayable suggestions (e.g., one or more final suggestions for correcting the input sentence into the fluent final sentence) that would be shown to the user (e.g., displayed by the user terminal 121 or 122). According to an embodiment, the displayable suggestions, which may be the final suggestions or intermediary suggestions, and comments are transmitted to the user terminal and displayed (e.g., via a web page or a word plugin) in such a way that the user can choose to accept or reject a suggestion or multiple suggestions. As discussed above with reference to Operation 406A, once a user has accepted a suggestion, the final fluent sentence with the accepted change may be shown to the user. According to an embodiment, additional suggested changes may be displayed to the user. That is, for each word or edit-span (e.g., two words or more, such as, a prepositional phrase), one suggestion may be displayed to the user so that the user may accept one of one or more suggested changes, or reject all of the one or more suggested changes. According to an embodiment, the sentence may be sent to the proposer module/functionality again to determine whether there are suggestions still remaining for the sentence. As discussed in Operation 406B of FIG. 4, if the user rejects a suggestion (or rejects all suggestions), the rejected suggestion(s) is/are removed from a list of suggestions. The list of suggestions may be individualized so that each user has their own list of suggestions. Each user may have multiple lists of suggestions, such as their own list of suggestions for multiple different contexts (e.g., a domain context). The lists of suggestions may be stored in a local memory or an external memory device (e.g., a cloud computer server, a distributed storage device).

According to an embodiment, the cycle of Operations 404-406 may be repeated for each word or edit-span (sentence portion) that has one or more suggested changes. That is, the cycle of Operations 404-406 may be repeated until there are no suggestions remaining from the final fluent sentence for presentation to the user.

According to an embodiment, the proposer module may provide suggested changes to the input sentence (or sentences). According to an embodiment, the proposer module may obtain the suggested changes from multiple different independent error correction methods/systems, such as, RB, SMT, NMT, DL, etc. The proposer module may obtain the input sentence(s) from a preprocessing module, which may include preprocessing logic/functionality and pass the preprocessed input sentence to one or more of the independent error correction system/method components. For example, the proposer module may pass the preprocessed input sentence to each of the independent error correction system/method components. According to an embodiment, the proposer module may pass the preprocessed input sentence to a DL (subject specific neural network) and to each of the remaining independent error correction system/method components that are not DLs. That is, according to an embodiment, one DL may be used (either a predefined subject-specific DL, which may be based on user selection, or a subject-specific DL that is based on recognition for a context for the paper that the input sentence is in, or a context of a portion of the paper (e.g., the input sentence, or a paragraph) that the input sentence is in.

The functionality of different independent error correction systems, according to an embodiment, are explained below with reference to FIG. 5B.

Figure 5B:
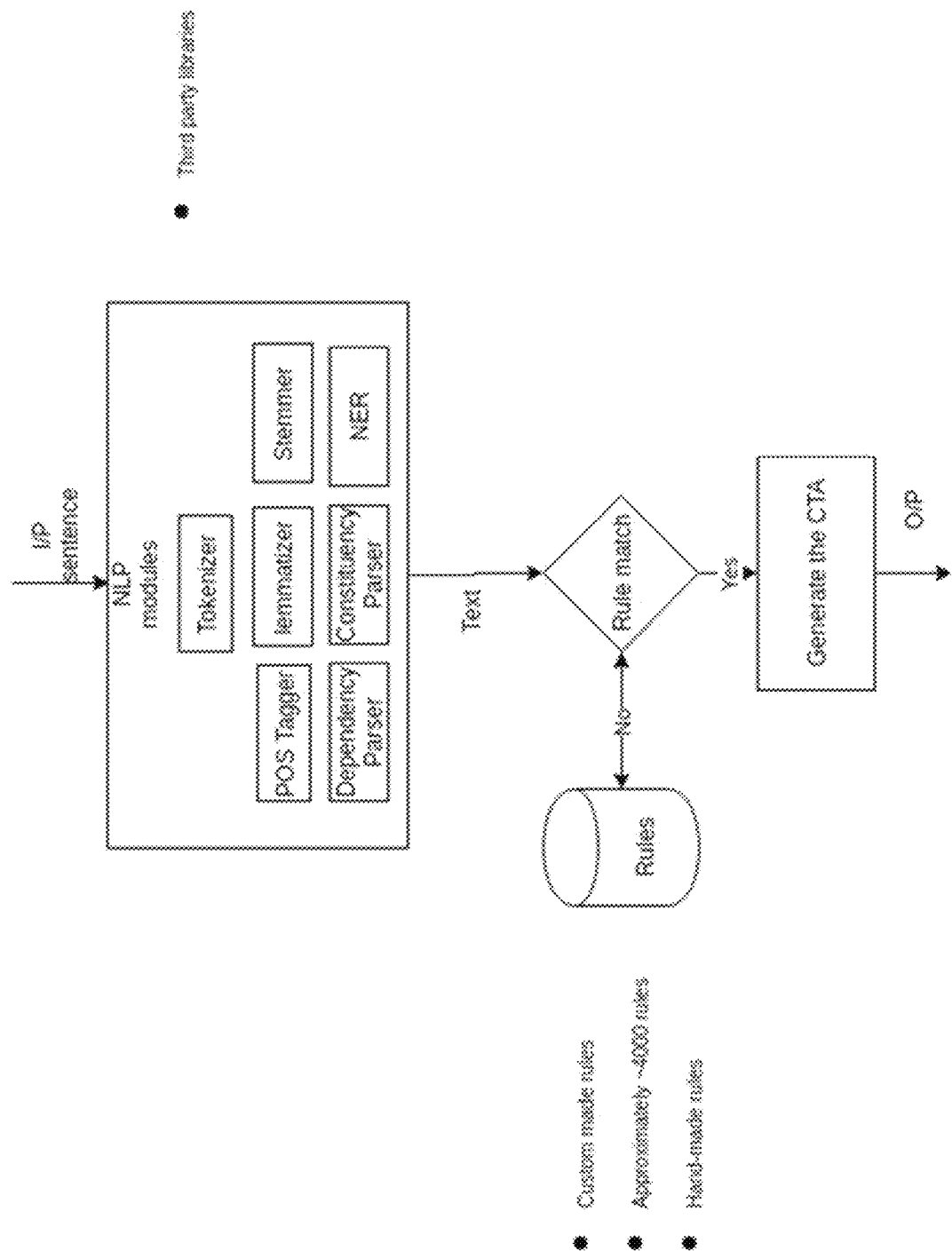
FIG. 5B shows an embodiment where a RB system/module is provided, according to an embodiment.

FIG. 5B shows an embodiment where a RB system/module is provided. As shown in FIG. 5B, the RB system may comprise of one or more natural language processing (NLP) modules. The one or more NLP modules may include one or more of: a tokenizer, a Part-Of-Speech (POS) tagger, Named-entity Recognition (NER) tagger, a Constituency Parser, a Dependency Parser, a Chunker, etc. According to an embodiment, the logic of the RB system (or module) may comprise hand-crafted rules that are based on English grammar rules. The hand-crafted (or custom-made rules, or hand-made rules) may include a large number of rules, such as 3,000+ rules. According to an embodiment, the number of rules may be approximately 4,000 rules. For example, consider the sentence "A boy go home." Here, the subject "boy" is singular and the verb "go" is plural, resulting in a subject-verb mismatch. According to an embodiment, the POS tagger and Dependency parser component of the RB system/module may each identify that there is a subject-verb relation between a singular subject and a plural verb, which may be considered a subject-verb mismatch. According to an embodiment, a rule may have been written and stored in the RB system/module that states that if a subject-verb relation exists between a singular subject and a plural verb, then prompt the user for changing one or more of: the verb to its singular form or the subject to its plural form. Thus, according to an embodiment, the RB system may prompt the user to change one or more of: "boy" to "boys" or "go" to "goes".

According to an embodiment, the NLP modules may also include a Lemmatizer and a Stemmer. Lemmatizer and stemmer are standard NLP libraries. According to an embodiment, the Lemmatizer may find the lemma, i.e., root, of a word, for example, "play" is the lemma of the word "playing" as well as "played". According to an embodiment, the Stemmer may remove affixes from the word leaving only a word stem. For example, "gener" will be stem of the word "generously".

According to an embodiment, the NLP modules may have access to third party libraries.

Referring back to FIG. 5A, the spell checker may be provided, which may be a dictionary-based spellchecker. According to an embodiment, the spell checker module may detect and correct one or more spelling error(s) in the input sentence. The spellchecker may comprise a lookup table, which may be stored in a memory, and may attempt to identify the correct spelling of an unknown word (e.g., a word not in dictionary) using the lookup table. According to an embodiment, the spellchecker may attempt to identify the correct spelling based on the Levenshtein distance between the unknown word and words present in the dictionary.

As shown in FIG. 5A, a statistical model 1 of a statistical system or module may be provided. The statistical model may follow a similar approach as Statistical Machine translation. According to an embodiment, the statistical model may be or have already been trained. The training of the statistical model may be based on using a Moses decoder which is an implementation of a statistical approach to machine translation. A Moses decoder approach may use large amounts of parallel data. Parallel data may be a collection of pairs of sentences such that one sentence of a pair is a grammatically incorrect sentence and the second sentence of the pair is the corrected sentence. According to an embodiment, the Moses decoder may align the grammatically incorrect and correct sentences with each other. For example, a grammatically incorrect sentence of "A boy go home." may be aligned with a grammatically correct sentence of "A boy goes home."

The Moses decoder may generate a phrase table during the training process where words/phrases like "go" & "goes" and "boy" & "a boy" are associated with each other. In this process, the Moses decoder may take the training data and use co-occurrences of words and phrases (sentence portions) to infer the corresponding correction.

As shown in FIG. 5A, one or more deep learning (DL) models may be provided in (or be accessible by) the proposer functionality. Each of the DL models may include a subject-specific deep-learning (DL) neural network. A DL model 1 will be explained below, and the other DL models may be similar to DL model 1, but different in the subject that it is specific to (e.g., the different DL models may each be associated with a different domain and hence trained based on a different corpus of academic documents associated with the respective domain). The DL model 1 may be a deep learning-based system. The DL model 1 may include Neural Machine Translation (NMT). The DL model 1 may be trained using the open source NMT system (Open MT). OpenNMT is an open-source framework for NMT systems. According to an embodiment, a seq2seq approach, which takes, as input, a sequence of words (e.g., an incorrect sentence) and outputs another sequence of words (e.g., a correct sentence), may be used. According to an embodiment, the context of the incorrect sentence may be captured using a hidden state vector and the captured context may be sent to the Decoder, which may then produce the correct sentence. According to an embodiment, an Attention mechanism, which allows a model to focus on different parts of an input sequence at every stage of an output sequence by preserving the context of the sequence, may be used.

As discussed above, different DL models may be constructed/built for different subject areas (e.g., different academic subject areas, different domains). For example, the DL model 1 may be a chemistry-domain model that is trained exclusively on academic chemistry manuscripts. According to an embodiment, one of the DL models may be a general academic domain model that is trained on a much larger set of manuscripts from various domains.

As discussed in FIG. 4, at Operation 402, a current subject may be identified. The identification of the current subject may be performed manually (e.g., pre-defined by the user), or based on a rule (e.g., use chemistry as the current subject for chemistry related text, otherwise use general as the current subject). The selection of which DL model to use may be automatically identified based on the current subject. For example, according to an embodiment, the chemistry-specific model may be added for chemistry related text; otherwise, the general academic model may be added. According to an embodiment, the model selection may be automated by implementing a subject-area classifier that assigns a subject area to the input text (or at least a portion of the input text). Internal tests have shown that the chemistry model performs much better than the general academic model when a chemistry document is evaluated.

Systems/modules used to provide suggestions/corrections have been described above. According to an embodiment, the proposer functionality can be changed, such as, by removing systems/modules, or by extending by adding more systems, such as more DL based systems which are trained with different parameters and/or trained with different domain data. According to an embodiment, a role of the proposer functionality may be to provide multiple suggestions by calling multiple different individual systems. According to an embodiment, there may be no interaction between the various systems in the proposer module.

According to an embodiment, a decoder module may be provided, as shown in FIG. 5A. According to an embodiment, the decoder module may receive various suggestions as input provided by the proposer module and output a fluent sentence. The decoder module may make use of a Beam search technique, which is a heuristic-based search algorithm that explores a graph by generating the correct sentence by expanding the most promising node. According to an embodiment, language models may be used for the exploration purpose. According to an embodiment, a decision of choosing a node may be based on a score, such as the perplexity (which is a measurement of how well the probability model predicts the sample) of the sentence in the chosen language model. According to an embodiment, the perplexity may represent the fluency of the sentence.

Figure 7A:
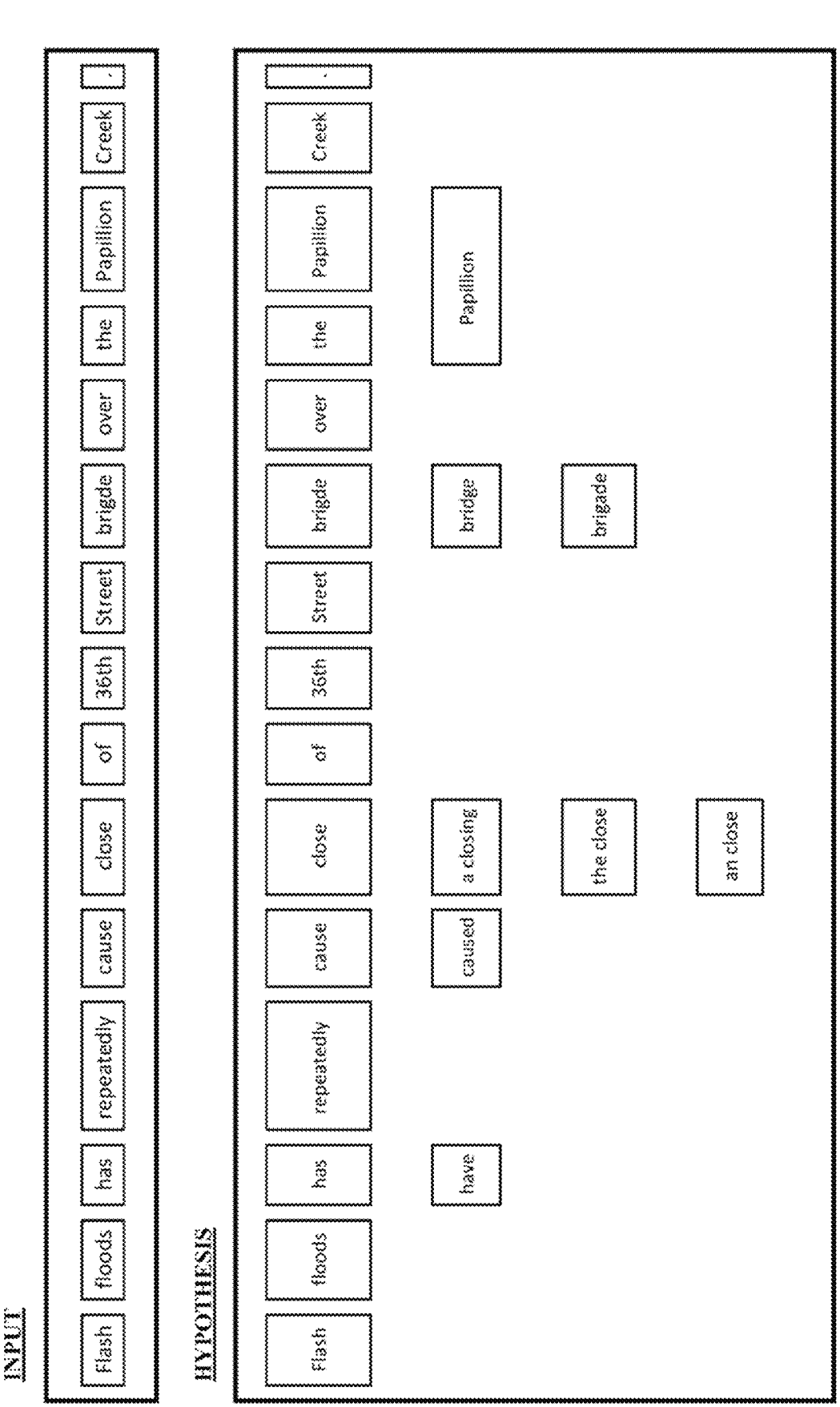
FIGS. 7A-7C illustrate examples regarding sentences and the various suggestions (hypotheses) from the different modules, according to various embodiments of the disclosure.

For example, let us consider the following sentence: "Flash floods has repeatedly cause close of $36^{th}$ Street bridge over the Papillion Creek." The sentence and the various suggestions (hypotheses) from the different modules in the proposer are shown in FIG. 7A, according to an embodiment of the disclosure.

FIGS. 6A-6C show data structure(s) that may be used according to an embodiment of the disclosure. For example, as shown in FIG. 6A, each document may be given a unique document identifier (ID). For example, as shown in FIG. 6A, a document in the Chemistry domain may have a document ID of 10001, and be stored locally at a document path of "C:\TrainingDocs\Chemistry\October2015ChemistryJournalPublication.doc."

For each document, sentence segmentation may be performed to split the document into sentences, according to an embodiment. According to an embodiment, domain information of each document may be stored in a document registry in order to run appropriate models. The document registry may be a table in the memory as shown in FIG. 6A.

According to an embodiment, as shown in FIG. 6B, a sentence registry may also be used to maintain mappings between sentences and documents based on the unique document id associated with the documents. That is, FIGS. 6A and 6B show two defined registries: a document registry to store document related information and a sentence registry to store sentence related information. According to an embodiment, the sentence registry may include a field called sentence_meta which stores all the necessary meta information along with a suggested output for that sentence.

FIG. 6C shows an exemplary embodiment of the meta information. According to an example embodiment, as shown in FIG. 6C, the meta information may be represented using JavaScript Object Notation (JSON). However, JSON is only used for illustrative purposes, and other suitable replacement languages may be used, such as, Extensible Markup Language (XML), Protocol-buffer, etc.

FIG. 6C shows an example on how the information is stored in meta. As shown in FIG. 6C, an input may be "boy go to school". The input may be passed through the preprocessing logic where data is tokenized and stored in tokens. Once the preprocessing is complete, the tokens may be passed through the proposer where several other modules execute and the suggestions and the edit-span information along with the modules that provide the suggestions are stored. Subsequently, the edit-span information along with the modules may be passed to the decoder module, which may execute decoding logic and shortlist the relevant information. According to an embodiment, shortlisted suggestions may include multiple suggestions for a given edit-span based upon a hypothesis level. The shortlisted suggestions may be carried forward to the Postprocessing logic, which may eliminate unnecessary changes or perform postprocessing over the output (in this example, "a boy" is changed to "A boy" by the post processing because it starts the sentence). The output of the postprocessor may be stored in an output key and may be shown to the user.

As shown in FIG. 7A, according to an example embodiment, there may be changes suggested for a sentence. For example, as shown in FIG. 7A, five different words or spans (sentence portions, e.g., prepositional phrases) may be suggested total by the different independent modules (e.g., SMT, NMT, and RB). According to an embodiment, as shown in FIG. 7A, the SMT module may suggest changing "has" to "have". According to an embodiment, as shown in FIG. 7A, NMT may suggest changing "cause" to "caused", and RB may suggest adding one of the articles "a", "an", or "the" before "close" and changing "close" to "closing". In addition, as shown in FIG. 7A, the spellchecker module may suggest changing "brigde" to "bridge", and SMT may suggest deleting the article "the" before "Papillion".

According to an embodiment, from among the above suggestions, the article deletion suggested by SMT may be identified as incorrect. Moreover, from the RB suggestions, only one suggestion (e.g., changing "close" to "the closing"), may be correct.

Figure 7B:
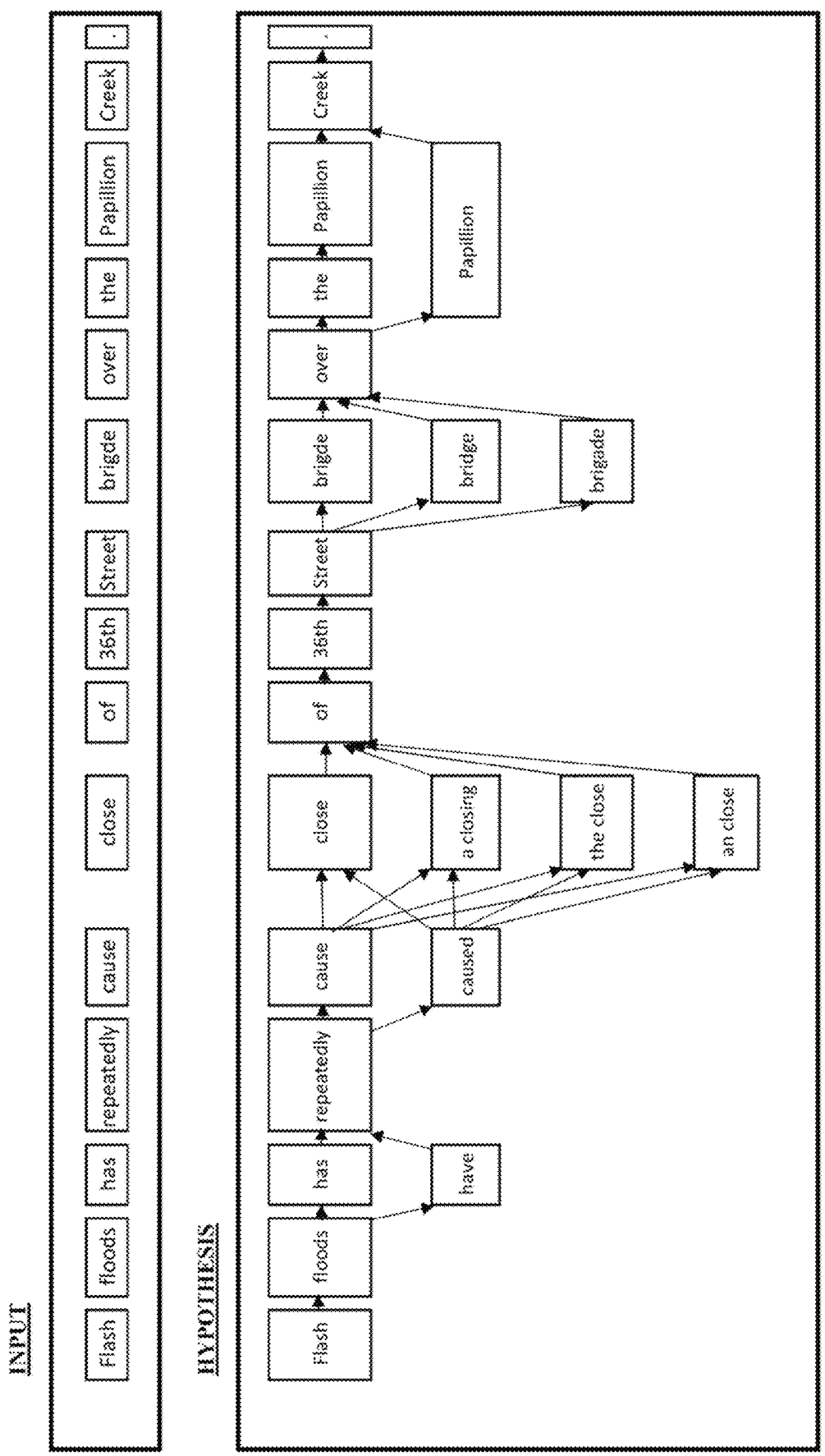

According to an embodiment, the decoder module may choose the correct suggestions and reject the incorrect suggestions given by the various systems. In particular, according to an embodiment, the decoder module may represent all the suggestions for a word along with the original word in a hypothesis space as shown in FIG. 7A. Next, according to an embodiment, the decoder module may start generating the sentence from scratch starting from a leftmost word. For example, as shown in FIGS. 7A and 7B, "Flash", which is at the $0^{th}$ position in the hypotheses space, is a leftmost word of the sentence. According to an embodiment, the decoder module may compute the perplexity for the word "Flash". According to an embodiment, because there is only one candidate at position 0, the decoder may move to the next word "floods" and compute the perplexity of "Flash floods". Again, there is only one candidate at position 1 and the next word may be processed. According to an embodiment, when there is only one candidate at a position, the perplexity computation may be skipped for that position. For example, the decoder module may skip positions 0 and 1 because they do not have any alternative suggested changes. According to an embodiment, as position 2, there may be two candidates, "has" and "have". Therefore, for position 2, the decoder may consider two segments "Flash floods has" and "Flash floods have" and compute the individual perplexity of each of the two segments.

According to an embodiment, the decoder module may continue this process to position 4, which is the next position with at least one suggested change. As shown in FIGS. 7A and 7B, the word "cause" may be at position 4, and the decoder module may consider the following four hypotheses and calculate their respective perplexities.

For example, as shown in FIG. 7B, the four hypotheses (e.g., candidate fluent sentences) at position 4 may include: "Flash floods has repeatedly cause", "Flash floods have repeatedly cause", "Flash floods has repeatedly caused", and "Flash floods have repeatedly caused".

According to an embodiment, the process may be continued until the last position of the hypothesis space is reached. For example, in FIGS. 7A and 7B, the last position of the hypothesis space may be a period punctuation mark ('.').

Figure 7C:
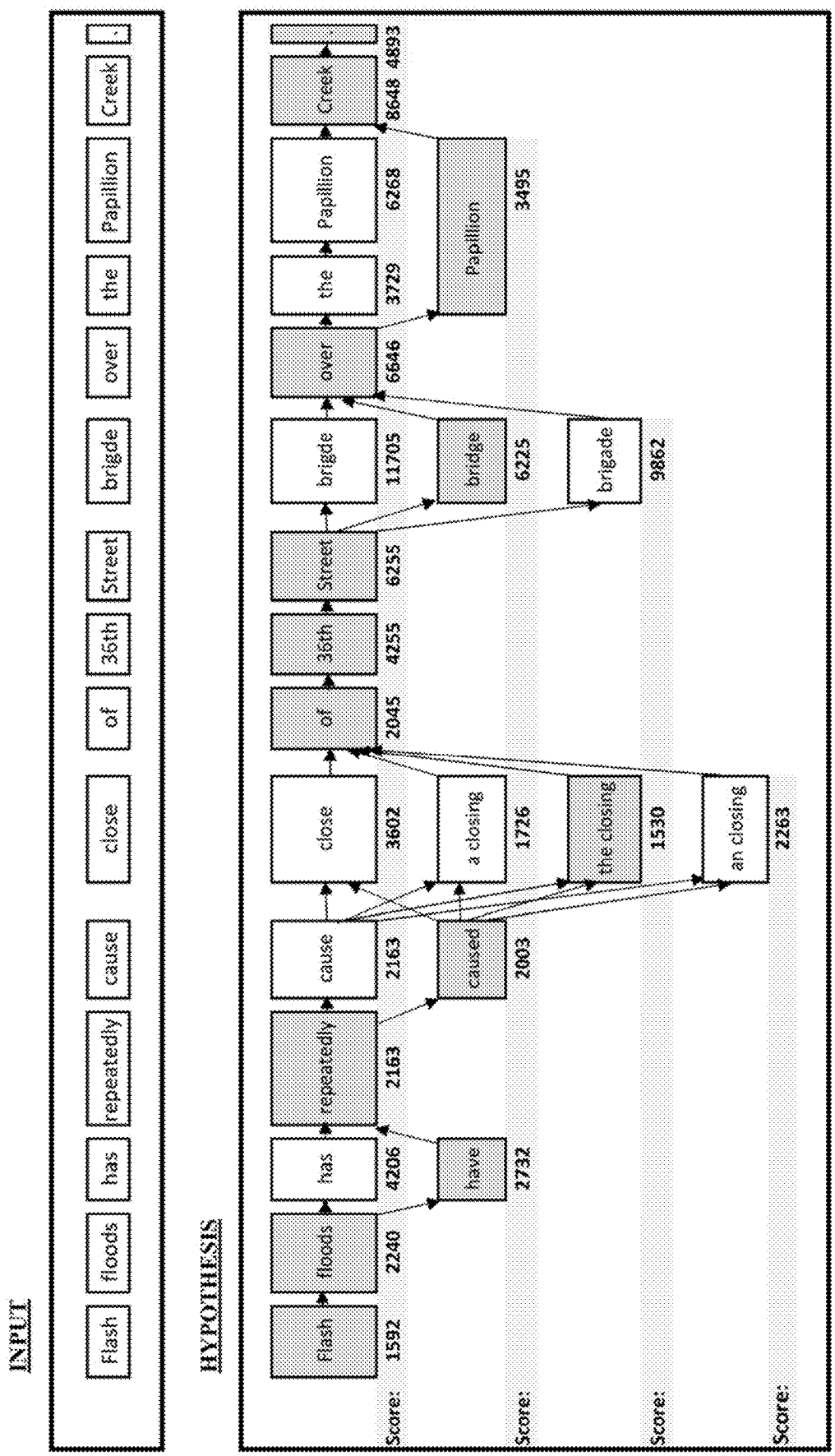

According to an embodiment, the decoder module may then backtrack and identify all the suggestions/hypotheses with the best score (e.g., a lowest perplexity score). According to an embodiment, the selection process may be restricted with a beam value of 1 so that only one suggestion is selected at each iteration. However, the beam value may be changed so that more than one suggestion is able to be selected at each iteration. For example, as shown in FIG. 7C, "Flash" may have a score of 1592, "Flash floods" may have a score of 2240, "Flash floods has" may have a score of 4206, and "Flash floods have" ("have" is replaced with "has") may have a score of 2732. That is, a sentence unit may be scored, then a subsequent sentence unit may be scored. For example, in FIG. 7C, there is a sentence unit of "Flash floods have" and a next sentence unit of "repeatedly caused" and "the closing of $36^{th}$ Street bridge over Papillion Creek." A sentence unit may be an entire sentence that is scored, or may be a portion of a sentence. A sentence unit may correspond to a phrase, a clause, a subject, a verb, a predicate, a prepositional phrase, a word, etc. That is, the score for each word may be a cumulative score for the word in the sentence unit. A different score may be calculated for each sentence unit (i.e., the cumulative score may reset when calculation for a new sentence unit begins). It should be noted that the actual scores of FIG. 7C are just exemplary in nature.

According to an embodiment, the decoder may select a sentence with the best score as fluent text (e.g., a fluent sentence). If the beam value is increased to 2, then two suggestions (e.g., with the two best scores) may be selected for each iteration. According to an embodiment, the beam value can be updated accordingly based on the client's request (a user terminal request, such as, a configuration change by the user).

According to an embodiment, the decoder may select a target sentence by evaluating and choosing output from several different models (e.g., several different models including one subject-specific DL neural network model from among a plurality of different subject-specific neural network models that have each been trained using subject-specific texts (e.g., documents, manuscripts).

FIG. 7C shows an example of a search tree produced by a beam-search decoder for the input sentence of "Flash floods has repeatedly cause close of 36th Street brigde over the Papillion Creek." According to an embodiment, the best scoring hypothesis (e.g., suggested sentence change) is found as "Flash floods have repeatedly caused the closing of 36th Street bridge over Papillion Creek." Additional hypotheses beyond what are shown may be used (some exemplary hypotheses are omitted due to space constraints).

That is, FIG. 7C shows a snapshot from a beam-search decoder module for Grammatical Error Correction (GEC), according to an embodiment. FIG. 7C shows different scores for each of the different proposed sentence portions. According to an embodiment, the proposer module may use a left-to-right beam search technique to calculate a left-to-right score as a current score, and calculate a future score, which is a score computed by considering a right-to-left beam search. According to an embodiment, the current score may be the left-to-right score computed from the 0th to the ith position whereas the future score may be computed from the n−1th to the ith position where n is the length of the sentence (or length of the sentence portion). A final score (as shown as an example in FIG. 7C) may be a sum of the current score and the future score.

The scoring logic may be purely based on a language model (e.g., a subject-specific neural network) and may not consider any additional features. The subject-specific neural network model may be an in-house language model (trained using several million sentences in academic documents) and multiple such language models can be added and trained on specific subject area sentences. As described throughout the disclosure, several modules, such as SMT, DL techniques, classification techniques, and rule-based techniques, are used and the models may be trained on academic domain data.

According to an embodiment, SMT, NMT, rule based, etc. may be used and run in parallel (e.g., parallel computing processors or GPUs) to identify the best corrections from these systems and then pass them to the decoder to generate a corrected sentence.

Referring back to FIG. 5A, a postprocessing module may be provided. According to an embodiment, output provided by the decoder module may be provided to the postprocessing module as shown in FIG. 5A. According to an embodiment, the decoder module may have high precision yet there may be some incorrect suggestions (false positives) that might degrade the sentence quality. That is, for example, modules like NMT might provide gibberish output that might jeopardize the precision of the proposer system/module. In order to avoid these situations, the postprocessing module may restrict such errors (e.g., false positives).

According to an embodiment, ERRANT (grammatical ERRor ANnotation Toolkit) functionality may be used. According to an embodiment, the ERRANT functionality may be designed and used to automatically extract edit(s) from parallel original and corrected sentences and classify them according to a new, dataset-agnostic, rule-based framework. See Abstract of "Automatic Annotation and Evaluation of Error Types for Grammatical Error Correction" (by Christopher Bryant, et al.; Proceedings of the 55th Annual Meeting of the Association for Computational Linguistics (Volume 1: Long Papers), pages 793-805; Published: July 2017). According to an embodiment, an aim of ERRANT is to automatically annotate parallel English sentences with error type information. Specifically, given an original and corrected sentence pair, ERRANT may extract the edits that transform the former to the latter and classify them according to a rule-based error type framework. Id. This can be used to standardize parallel datasets or facilitate detailed error type evaluation. Id. Annotated output files are in M2 format and an evaluation script is provided. Id.

As shown in FIG. 5A, the decoder functionality may include one or more of beam searching, language models, and combining suggestions from several modules and maintaining sentence fluency.

According to an embodiment, the postprocessing module may include rules, quality estimation modules, a classifier, error labeling and eliminating gibberish errors. For example, the post processing module may categorize the output from the decoder into error categories, such as, Subject Verb Agreement, Noun Numbers, Spell Checker, Article, Other errors, etc. According to an embodiment, information regarding predetermined rules may be stored. The predetermined rules may be based on, for example, the error category and the proposer module the suggestion is coming from, and the rules may perform one or more of: eliminating the false positives and avoiding giving gibberish results as an output, as shown in FIG. 5A.

For example, for an original sentence of "I want to eat apples" add "a" before "apples" may be suggested by the proposer module. However, the postprocessing module may include a postprocessing rule that states "Ignore addition of 'a' or 'an' before plural nouns." Accordingly, the postprocessing rule may prevent the incorrect suggestion from being shown to the user (as a suggested change). Moreover, several thousands of sentences may be evaluated using the processing of FIG. 5A and the output may be categorized as correct or incorrect. Based on a result of evaluating the several thousands of sentences, the model may be optimized to perform better for each of the type of changes. For example, NMT may have better performance in article error correction whereas SMT may have better performance in subject-verb agreement. According to an embodiment, some error categories may correspond to an error for which none of the modules of the proposer module have an acceptable level of performance. According to an embodiment, the ML suggested changes in error categories for which none of the proposer modules have an acceptable level of performance may be ignored to avoid degradation of the original sentence.

While the disclosure describes several exemplary embodiments, there are various equivalent substitutes and modifications, which are within the scope of the present disclosure. Those of ordinary skill in the art will be able to appreciate different embodiments, although not explicitly described or shown in the present disclosure, embody principles of the disclosure and are thus within the scope of the disclosure.

The invention claimed is:

1. A responsive server for performing domain-specific grammar correction, the responsive server comprising:
a network communication interface configured to communicate with one or more user terminals over a network; and
a processor configured to:
control the network communication interface to provide, within a displayed word processing text editor of a user terminal, a domain-specific grammar correction feature that includes:
identifying text in the word processing text editor;
automatically identifying a domain-specific deep-learning neural network that corresponds to an identified context of the identified text, from among one or more trained domain-specific deep-learning neural networks;
automatically identifying at least one suggested replacement word using the identified domain specific deep-learning neural network that corresponds to the identified context; and automatically controlling a display to display a user interface that includes functionality that presents prompt information that includes the at least one suggested replacement word;

performing one or more error correction methods that generate independent suggestions, the error correction methods include one or more of: a rule-based (RB) method, a statistical machine translation (SMT) method, or a neural machine translation (NMT), and each of the different error correction methods suggest independent corrections;

when two or more of the one or more error correction methods are performed, combining outputs from the two or more of the one or more error correction methods by: using a Beam search technique, which is a heuristic-based search algorithm that explores a graph by generating a correct sentence by expanding a most promising node, wherein a decision of choosing the most promising node is based on a score that represents a fluency of a sentence; and accepting correct suggestions and reject incorrect suggestions given by the different error correction methods by:

representing all suggestions for a word along with the original word in a hypothesis space;

start generating the sentence from scratch starting from a leftmost word for which a suggestion has been made;

computing a first perplexity score for the leftmost word for which at least one suggestion has been made, and a second perplexity score for the at least one suggestion itself, wherein the second perplexity score includes one perplexity score for each of the at least one suggestion;

backtracking and identifying all suggestions for a sentence with a best score; and selecting a sentence with the best score as a fluent sentence.

2. The responsive server according to claim 1, wherein the processor is further configured to, after presenting the prompt information:

receive user input regarding the at least one suggested replacement words;

based on the received user input indicating that the at least one suggested replacement word is accepted, correct the sentence using the at least one suggested replacement word; and based on the received user input indicating that the at least one suggested replacement word is rejected, remove the at least one suggested replacement word from a list of suggestions for the identified sentence in the identified domain-specific deep-learning neural network.

3. The responsive server according to claim 1, wherein the processor is further configured to train a neural network by:

collecting documents from one or more sources;

preparing training data for each of different subject matter-specific fields of the documents; and building a domain-specific deep-learning neural network model by using the obtained training data associated with a respective one of the subject-matter specific fields, when a number of documents in the obtained training data associated with the respective one of the subject-matter specific fields is greater than or equal to a threshold value.

4. The responsive server according to claim 1, wherein the processor is further configured to: automatically identify a trained subject-specific neural network that corresponds to a current subject, which is a subject that is either set in advance or that is automatically identified based on a context of the input sentence or current document.

5. The responsive server according to claim 1, wherein the processor is further configured to: when two or more of the one or more error correction methods are performed, combine outputs from the two or more of the one or more error correction methods to provide a final fluent recommended sentence for the specific domain.

6. The responsive server according to claim 1, wherein the score that represents the fluency of a sentence is a perplexity score, which is a measurement of how well a probability model predicts a sample of a sentence in a chosen language model.

7. The responsive server according to claim 1, wherein the processor is further configured to: based on the score that represents the fluency of the sentence, identify a final fluent sentence by accepting correct suggestions and rejecting incorrect suggestions given by the different error correction methods.

8. The responsive server according to claim 7, wherein the processor is further configured to: output to the user terminal at least one of the correct suggestions as a proposed suggested change for the input sentence.

9. The responsive server according to claim 1, wherein the processor is further configured to: use a left-to-right beam search technique to calculate a left-to-right score as a current score, and calculate a future score, which is a score computed by considering a right-to-left beam search, wherein the current score is the left-to-right score computed from the 0th to the ith position whereas the future score computes a score from the n−1th to the ith position where n is the length of the sentence, and a final perplexity score is a sum of the current score and the future score.

10. The responsive server according to claim 1, wherein the processor is further configured to: select a target sentence by combining the output from several different models including one subject-specific deep learning (DL) neural network model from among a plurality of different subject-specific neural network models that have each been trained using subject-specific documents and manuscripts.

11. The responsive server according to claim 9, wherein the current score and the score are calculated purely based on the subject-specific deep learning neural network or a statistical language model.

12. The responsive server according to claim 11, wherein the subject-specific deep learning neural network language model is run on a parallel computing processor including at least one general processor or graphics processing unit (GPU).

13. The responsive server according to claim 1, wherein the processor is further configured to:

perform post-processing of the fluent final sentence including one or more of: labeling each of the correct suggestions into different error categories, removing incorrect suggestions based on predefined rules, and generating comments to a user to accompany displayable one or more final suggestions for correcting the input sentence into the fluent final sentence.

14. A method of controlling a responsive server that includes a hardware processor to perform domain-specific grammar correction, the method comprising:

controlling a network communication interface to provide, within a displayed word processing text editor of a user terminal, a domain-specific grammar correction feature that includes:
  identifying text in the word processing text editor;
  automatically identifying a domain-specific deep-learning neural network that corresponds to an identified context of the identified text, from among one or more trained domain-specific deep-learning neural networks;
  automatically identifying at least one suggested replacement word using the identified domain specific deep-learning neural network that corresponds to the identified context; and
  automatically controlling a display to display a user interface that includes functionality that presents prompt information that includes the at least one suggested replacement word;
performing one or more error correction methods that generate independent suggestions, the error correction methods include one or more of: a rule-based (RB) method, a statistical machine translation (SMT) method, or a neural machine translation (NMT), and each of the different error correction methods suggest independent corrections;
when two or more of the one or more error correction methods are performed, combining outputs from the two or more of the one or more error correction methods by: using a Beam search technique, which is a heuristic-based search algorithm that explores a graph by generating a correct sentence by expanding a most promising node, wherein a decision of choosing the most promising node is based on a score that represents a fluency of a sentence; and
accepting correct suggestions and reject incorrect suggestions given by the different error correction methods by:
  representing all the suggestions for a word along with the original word in a hypothesis space;
  start generating the sentence from scratch staring from a leftmost word for which a suggestion has been made;
  computing a first perplexity score for the leftmost work for which at least one suggestion has been made, and a second perplexity score for the at least one suggestion itself, wherein the second perplexity score includes one perplexity score for each of the at least one suggestion;
  backtracking and identifying all suggestions for a sentence with a best score; and
  selecting a sentence with the best score as a fluent sentence.

15. The method according to claim 14, further comprising, after presenting the prompt information:
  receiving user input regarding the at least one suggested replacement word,
  based on the received user input indicating that the at least one suggested replacement word is accepted, correcting the sentence using the at least one suggested replacement word; and
  based on the received user input indicating that the at least one suggested replacement word is rejected, removing the at least one suggested replacement word from a list of suggestions associated with the portion of the identified text, and use the updated list to automatically generate postprocessing rules to use in the future.

16. A non-transitory computer-readable medium comprising computer-executable instructions, which when executed by a processor, cause the processor to perform the method of claim 14.

* * * * *